Jan. 19, 1932.  A. SCHWARZ  1,842,125
PROPELLING AND STEERING MECHANISM
Filed March 3, 1930   3 Sheets-Sheet 1

Witness:
William P. Kilroy

Inventor:
August Schwarz
By
Atty

Jan. 19, 1932. A. SCHWARZ 1,842,125
PROPELLING AND STEERING MECHANISM
Filed March 3, 1930 3 Sheets-Sheet 2

Witness:
William P. Kilroy

Inventor:
August Schwarz
By Hill & Hill
Attys.

Jan. 19, 1932.  A. SCHWARZ  1,842,125
PROPELLING AND STEERING MECHANISM
Filed March 3, 1930   3 Sheets-Sheet 3
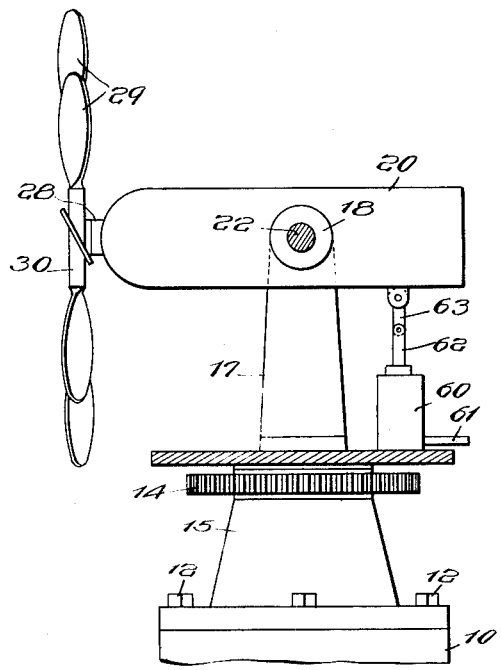
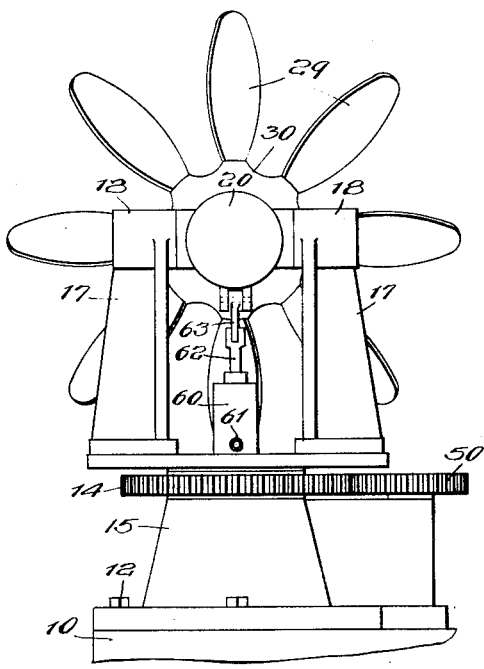

Patented Jan. 19, 1932

1,842,125

UNITED STATES PATENT OFFICE

AUGUST SCHWARZ, OF CHICAGO, ILLINOIS

PROPELLING AND STEERING MECHANISM

Application filed March 3, 1930. Serial No. 432,733.

The invention relates to propelling and steering mechanism operable for use with vehicles conveyable through and supported by a fluid medium.

More particularly the invention relates to an assembly of prime movers preferably taking the form of motor actuated air propellers mounted upon a marine boat to serve as independently actuated auxiliary power plants.

The invention has one of its most important applications in connection with modern high speed vessels such, for example, as torpedo boats wherein quick maneuvering and change of course is highly desirable.

The invention contemplates the mounting of a plurality of motor actuated air propellers upon the deck of a marine vessel, such propellers being preferably arranged in pairs at each end of the vessel with intermediate propellers, if any, likewise arranged in pairs.

The propellers are preferably arranged upon the deck of the vessel in outboard relation so as to intrude as little as possible upon the normal clear deck space. Inasmuch as it is desirable that the space provided for the main power plant be as small as possible, a system of auxiliary power systems, as contemplated by the invention, which supplements and increases the emergency speed capacity of the vessel without requiring additional space for the boilers and machinery comprising the main power system is a valuable feature of the invention.

A particular object of the invention is the provision of an assembly of auxiliary power plants upon the deck of a marine vessel so arranged as to accelerate or retard the normal speed at which the vessel is driven by the main power plant.

Other objects of the invention include the provision of an assemblage of air propellers each independently rotatable about vertical and horizontal axes whereby the power or pull of the propellers may be exerted at any angle thereby permitting the steering of the vessel at any desired angle but still maintaining an even keel.

By inclining the propellers positioned on the bow of the vessel, either to the right or the left and oppositely inclining the propellers positioned on the stern the joint pull exerted thereby performs the functions of a rudder enabling the course of the vessel to be quickly changed and brought rapidly out of range of a missile hurled from a distance. Similarly, by directing all of the propellers in the same general direction, the vessel can be held to a straight course, regardless of a strong wind blowing from either side. If a high speed is desired in excess of the capacity of the main power plant, the auxiliary system can be started and the normal speed of the vessel be thereby increased. The propellers being rotatable about a vertical axis can be turned so as to exert a pull opposite to the direction of travel and utilized to assist in bringing the vessel to a quick stop.

Other objects of the invention include the provision of an assemblage of propellers so mounted that the power or pull of each propeller may be exerted at any desired practicable angle with the vertical or horizontal.

A still further particular object is the provision of propelling means operable to exert substantially a vertical pull whereby a vessel which is grounded can be more easily released, the propellers at the grounded end being set substantially vertical and at the opposite end so directed as to impart a swinging motion to the vessel.

Still another object of the invention is the provision of an auxiliary power system for marine vessels providing a plurality of air propellers which is exceedingly simple in construction, easy to manipulate and control, efficient and reliable, strong, durable and otherwise well adapted to the purpose for which it is designed.

The invention also contemplates the provision of a propeller having a plurality of blades numbering more than two, the larger number of blades enabling the propeller to be operated at a relatively low speed. The blades can be made wider and can be set at a different angle than the usual two blade propeller, whereby increased pulling power and diminished noise of operation results. The construction and mounting of the propeller is such that there is substantially unrestricted passage of air between the blades except at the base support.

A still further object is the provision of a propeller having wide numerous blades which develop more power at a slow speed than does the usual two blade propeller when operated at a high rate of speed.

Referring now to the drawings, forming a part of this specification, and wherein like reference characters indicate like or corresponding parts, Fig. 1 is a diagrammatic plan view of a vessel equipped with the device of my invention;

Figs. 6 and 7 are side and end views, respectively, of a propeller controlled by hydraulic pressure.

Figure 1:
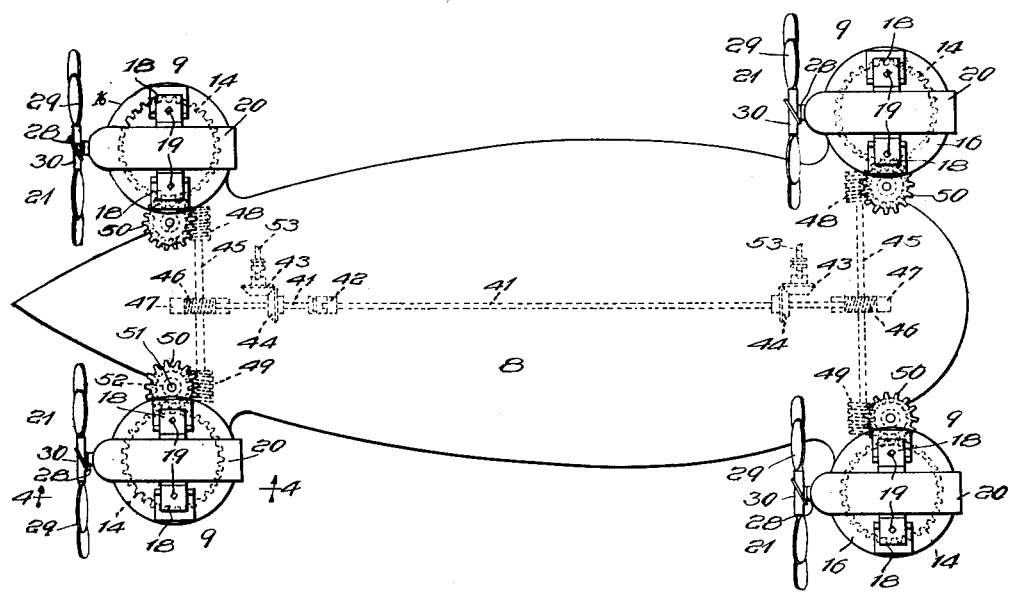
Figure 2:
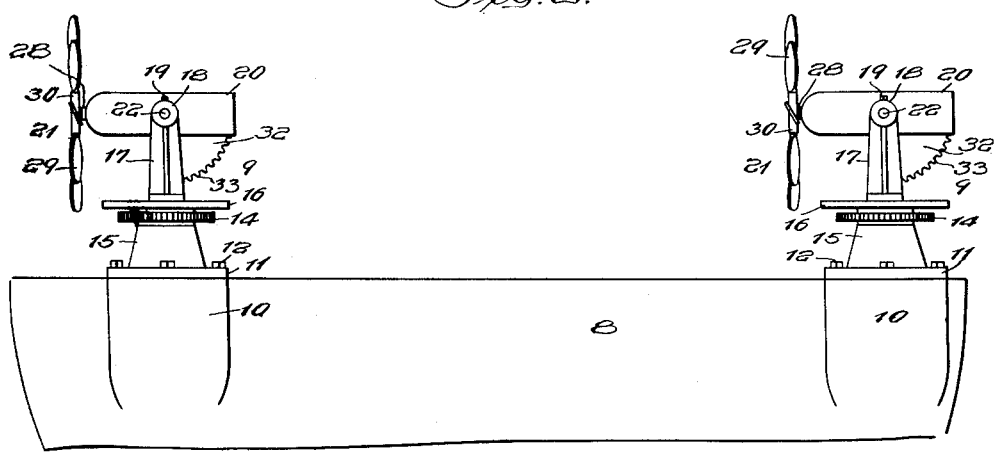
Fig. 2 is a side view of the vessel shown in Fig. 1.
Figure 3:
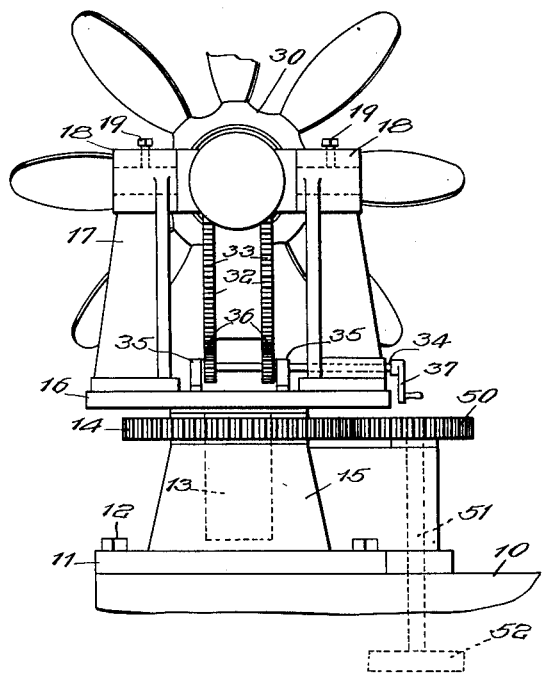
Fig. 3 is a front view of one of the propelling devices comprising my invention.
Figure 4:
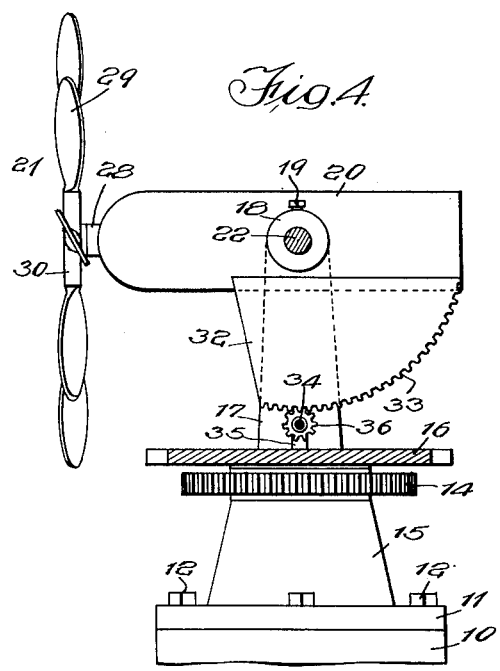
Fig. 4 is a side elevational view of the propelling device shown in Fig. 3.
Figure 5:
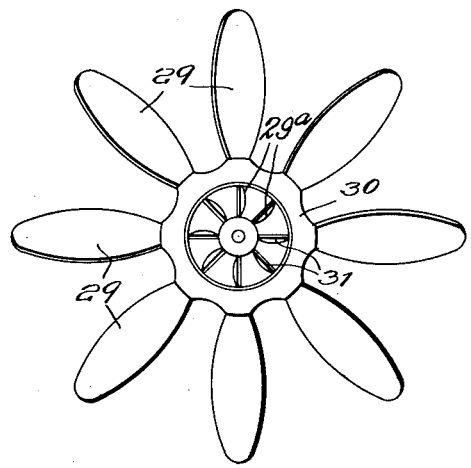
Fig. 5 is a view showing the detail construction of the blades and a rotary frame comprising the propellers.

Referring now more particularly to the drawings, the numeral 8 designates a marine vessel upon the deck of which a plurality of interconnected propelling devices 9 comprising my invention are mounted.

A plurality of platforms 10, or similar outboard supporting devices, are provided and arranged in pairs, one pair being positioned at the bow of the vessel, and the other at the stern. Each of the propelling devices 9 is mounted on a base or pedestal 11 carried by one of the platforms 10. A plurality of bolts 12 are provided to fasten the base or pedestal 11 to the platforms 10. Each of the pedestals 11 comprise a sleeve portion 15 in which a vertical shaft 13 is mounted. A gear wheel 14, mounted on the upper end of the shaft 13, has an upwardly projecting hub portion which provides a mounting for a bearing plate 16. The bearing plate 16 and the gear 14 rotate together about a vertical axis through the shaft 13.

A prime mover, preferably taking the form of a motor 20, is carried by a pair of standards 17 suitably mounted upon and rotatable with the plate 16.

A pair of trunnions or bosses 22 are journaled in bearings 18 forming the top portion of the standards 17. The mounting of the trunnions 22 in the bearings 18 permits the motor 20 to be rotated about a horizontal axis and inclined to the vertical as desired. Stud bolts 19 are provided to hold the motor 20 in adjusted position against rotation of the trunnions 22 in their bearings. The motor 20 is rotatable about its horizontal axis by means of a crank 37 mounted on one end of a shaft 34. The shaft 34 is journaled in a pair of bearings 35 positioned on opposite sides of a pair of plates 32, projecting downwardly from the motor 20. The lower edge of the plates 32 are each provided with a segmental gear 33 with which gears 36 mounted in the shaft 34 mesh. A crank 37 provides means for manually rotating the shaft 34 and tilting the motor 20 at any desired angle to the horizontal. Similarly, rotation of the shaft 13, by means hereinafter more particularly described, enables the propeller to be rotated about a vertical axis, as desired. When the propellers are mounted on opposite ends of air-ships, or the like, such propellers may be positively inclined to the vertical and as a result, the ship can be raised and lowered in vertical alignment without any forward or backward movement and thereby landed on or taken off from a restricted space.

Hydraulic pressure mechanism, as shown in Figs. 6 and 7, is adapted to rotate the motor 20 and vary its inclination to the vertical. The hydraulic pressure mechanism is substituted for the manually actuated crank 37, and comprises a pump 60, mounted upon the plate 16 and connected by means of a pipe 61 with a source of hydraulic pressure (not shown). A reciprocally movable piston 62 is connected with the motor 20 by means of a link 63. It is obvious that the pump 60, mounted as shown, is operable to rotate the motor 20 through a substantially large vertical angle.

The propeller 21 comprises a plurality of blades 29 mounted upon a rotary frame comprising a ring 30 and spokes 31. While more than two blades are shown, it is to be understood that two blade propellers may also be utilized in embodying the principles of my invention. Each of the spokes 31 has a plate 29a mounted thereon at an angle to direct air rearwardly along the axis of the propeller. Air thus passing between the blades will partially air-cool the motor. The propelling devices 9 are arranged in pairs, one at the bow and one at the stern of the vessel 8. The propelling devices 9, thus arranged in pairs, are connected by a system of gears and shafts so as to be simultaneously rotated about a vertical axis, and thereby have the same angle of inclination to the course of the vessel.

In one embodiment of the invention, the steering mechanism, operable to rotate the devices 9 about a vertical axis, comprises a transversely extending shaft 45 having a worm driven mechanism at its middle portion. The driven mechanism comprises a worm 46 operatively engaging a gear 47. Right and left hand worms 48 and 49, respectively, are each mounted on opposite ends of the shaft 45 in operative engagement with a gear 52. The gears 52 are each fixedly mounted upon a vertical shaft 51. The upper end of the shaft 51 carries the gear 50 in meshing engagement with the gear 14 which is journaled in the sleeve 15, as already described.

The steering mechanism for the two pairs of propelling devices 9 is identical and both sets are actuated by a two section, longitudinally extending shaft 41. The two sections of the shaft 41 are connected by clutch mechanism 42 to permit the sections to be rotated together or separately.

In utilizing the propelling devices as a steering or rudder device for the vessel, it is desirable that the two pairs of propellers be directed at opposite inclinations to the axis of the vessel. For this purpose the two sections of the rod 41 are provided with independent actuating means (not shown). The actuating means may be power driven as by a motor or the like, or it may be operated manually. Such actuating means is shown as connected with the rod 41 by means of a shaft 53. The shafts 53 are connected with the shaft 41 by bevel gears 43 and 44, respectively. The bow and stern pairs of propellers are independently operated by disconnecting the two sections of the shaft 41, thereby enabling the propellers at the bow to be directed oppositely to those positioned at the stern. By thus inclining the propellers at one end of the vessel oppositely to those at the other end, the vessel is enabled to be turned sharply and rapidly moved out of the range of the guns of a hostile fleet.

The propelling mechanisms 9 are preferably all directed at the same angle to the longitudinal axis of the vessel when it is desirable to hold a fixed course of the vessel regardless of the direction of the wind. The various mechanisms 9 are maintained at the same angle of inclination by connecting the two sections of the rod 41 through a clutch 42. The two sections of the rod 41, as a result, rotate as a unit and permit all of the mechanisms 9 to be manipulated by a single actuating device. The normal speed of a vessel, equipped with the auxiliary power system comprising my invention, can be accelerated by having the propellers 9 pulling in the direction the vessel is traveling and similarly the speed can be greatly retarded and a quick stop made by turning the propellers through an angle of one hundred eighty degrees, so as to pull in a direction opposite to the direction of travel of the vessel.

The rapid change of course resulting from utilizing the mechanism 9, as a steering device, may be accomplished and meantime, the vessel be maintained at an even keel. The rapid acceleration or retardation of the normal speed, and the quick change of course accomplished by a vessel equipped with the device of my invention is highly desirable for any vessel and especially so for naval vessel in time of war, as danger of collision is minimized and the possibility of dodging missiles fired from a great distance is greatly increased.

In the event that a vessel equipped with my invention becomes grounded, its release is easily accomplished by inclining the propellers adjacent the grounded end to a substantially vertical position and utilizing the propellers at the opposite end of the vessel to produce a downward and swinging motion of the vessel and a pull in a direction generally away from the obstacle.

Thus, it will be seen that applicant has provided auxiliary power or propelling mechanism suitable for mounting upon a vessel and by reason of the novel means of connecting and controlling the propelling devices, highly advantageous results are accomplished in the steering and control of the speed of the vessel.

While the invention has been shown and described as mounted on a marine vessel, it is to be understood that it can be used with airships and aeroplanes or any other vehicle propelled through and supported by a fluid medium.

The foregoing described propelling and steering mechanism, when mounted on an airship, permits a safer and quicker ascent, as well as a safer landing, to be made, and a smaller landing crew is required than is the case with airships not equipped with the device of my invention. Furthermore my propelling and steering mechanism makes it possible to hold the airship at any desired height either when going up or down, without being compelled to throw off ballast or to let out gas, and this propelling and steering mechanism makes it possible for the airship to fight with better success against a storm and to hold its course.

The desirable results achieved by my invention make it especially applicable to army and navy, as well as civil, airships.

My propelling and steering mechanism can also be applied to airplanes having several motors with the result that a safer and quicker ascent and landing on a smaller space of ground or water may be accomplished. An airplane equipped with the device of my invention is also able to advance with better success and hold its course against a storm.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. The combination with a vehicle conveyable through and supported by a fluid medium of an auxiliary power plant therefor comprising a battery of air propellers arranged in pairs each actuated by an individual motor, and means connecting the propellers comprising a pair, said means being operable to simultaneously direct the propellers comprising a pair at any desired angle of inclination to the longitudinal axis of the vehicle, and means for operating the first mentioned means simultaneously.

2. In a device of the class described a plurality of air propellers arranged in pairs, means for adjusting each pair as a unit in any desired angle in a horizontal plane and means for coupling together and disconnecting said adjusting means.

3. In a device of the class described the combination of a vehicle conveyable through and supportable by a fluid medium with a plurality of air propellers arranged in pairs, an individual prime mover for each propeller and means for adjusting each unit comprising a prime mover and a propeller in any desired angle in a horizontal plane, said means comprising a support for each prime mover, a vertical shaft thereon, a sleeve supported by said vehicle and adapted to receive the vertical shaft rotatably, a spur gear on said shaft, a second vertical shaft rotatably arranged adjacent the first shaft a second spur gear rigidly mounted on said second shaft and meshing with the first gear, a worm gear rigidly mounted on the second shaft, a horizontal shaft extending between the second shafts of each pair of driving mechanism, a worm on each end of said horizontal shaft meshing with the adjacent worm gear, one of said worms being right handed, and the other left handed, and means for rotating said horizontal shaft.

4. In a device of the class described the combination of a vehicle conveyable through and supportable by a fluid medium with a plurality of prime movers arranged in batteries, means for adjusting the prime movers at any angle in a horizontal plane, said means comprising a support for the prime mover, a vertical shaft on said support, a sleeve supported by the vehicle and adapted to rotatably receive the vertical shaft, a spur gear rigidly mounted on the shaft, a second vertical shaft rotatably arranged adjacent the first shaft a second spur gear rigidly mounted on said second vertical shaft and meshing with the first spur gear, a worm gear on the second vertical shaft, a horizontal shaft extending between the adjusting means of two prime movers forming a pair, a right hand worm on one end of the horizontal shaft, a left hand worm on the other end of said shaft, said worms meshing with the worm gears on the second vertical shafts a second horizontal shaft extending at right angles to the first horizontal shaft, means for rotating said second horizontal shaft and cooperating means on the two horizontal shafts for transmitting rotary movement of the second horizontal shaft to the first horizontal shaft.

5. In a device of the class described the combination of a vehicle conveyable and supportable by a fluid medium with a plurality of prime movers arranged in pairs, means for adjusting each pair of prime movers simultaneously and identically in the horizontal plane, said means comprising a support for each prime mover, a vertical shaft on said support, a sleeve supported by the vehicle and adapted to receive the shaft rotatably therein, a second vertical shaft rotatably arranged adjacent the first shaft, a spur gear rigidly mounted on the first shaft, a second spur gear rigidly mounted on the second shaft and meshing with the first gear, a worm gear on each of the second shafts, a horizontal shaft, extending between the two second vertical shafts, a right hand worm on one end of said horizontal shaft and a left hand worm on the other end, said worms meshing with the worm gears on the vertical shafts, a second horizontal shaft extending at right angles to each first horizontal shaft, means for imparting rotary movement to the second horizontal shaft, cooperating means on the two horizontal shafts for transmitting rotary movement from the second to the first horizontal shaft and means for connecting and disconnecting adjacent shafts of the second horizontal set.

6. A plurality of air propellers arranged in pairs, means for adjusting each pair as a unit in any desired angle in a horizontal plane, means for coupling together and disconnecting said adjusting means, and an outboard platform on said vessel for each of said air propellers.

7. In a device of the class described the combination of a vessel with a plurality of air propellers arranged in pairs, an individual prime mover for each propeller and means for adjustinng each unit comprising a prime mover and a propeller in any desired angle in a horizontal plane, said means comprising a support for each prime mover, a vertical shaft thereon, a sleeve adapted to receive rotatably the vertical shaft, an outward platform on said vessel for each of said prime movers, the sleeves being supported by said outboard platform a spur gear on said shaft, a second vertical shaft rotatably arranged adjacent the first shaft a second spur gear rigidly mounted on said second shaft and meshing with the first gear, a worm gear rigidly mounted on the second shaft, a horizontal shaft extending between the second shafts of each pair of driving mechanism, a worm on each end of said horizontal shaft meshing with the adjacent worm gear, one of said worms being right handed, and the other left handed, and means for rotating said horizontal shaft.

8. In a device of the class described the combination of a vessel with a plurality of prime movers arranged in batteries, means for adjusting the prime movers at any angle in a horizontal plane said means comprising a support for the prime mover, a vertical shaft on said support, a sleeve adapted to rotatably receive the vertical shaft, an outboard platform on the vessel adapted to carry said sleeve, a spur gear rigidly mounted on the shaft, a second vertical shaft rotatably arranged adjacent the first shaft a second spur gear rigidly mounted on said second vertical shaft and meshing with the first spur gear, a worm gear on the second vertical shaft, a horizontal shaft extending between the adjusting means of two prime movers forming a pair, a right hand worm on one end of the horizontal shaft, a left hand worm on the other end of said shaft, said worms meshing with the worm gears on the second vertical shafts a second horizontal shaft extending at right angles to the first horizontal shaft means for rotating said second horizontal shaft and cooperating means on the two horizontal shafts for transmitting rotary movement of the second horizontal shaft to the first horizontal shaft.

9. In a device of the class described the combination of a vessel with a plurality of prime movers arranged in pairs, means for adjusting each pair of prime movers simultaneously and identically in the horizontal plane, said means comprising a support for each prime mover, a vertical shaft on said support, an outboard platform on the vessel, a sleeve supported by said platform and adapted to receive the shaft rotatably therein, a second vertical shaft rotatably arranged adjacent the first shaft, a spur gear rigidly mounted on the first shafts, a second spur gear rigidly mounted on the second shaft and meshing with the first gear a worm gear on each of the second shaft, a horizontal shaft, extending between the two second vertical shafts, a right hand worm on one end of said horizontal shaft and a left hand worm on the other end, said worms meshing with the worm gears on the vertical shafts, a second horizontal shaft extending at right angles to each first horizontal shaft, means for imparting rotary movement to the second horizontal shaft, cooperating means on the two horizontal shafts for transmitting rotary movement from the second to the first horizontal shaft and means for connecting and disconnecting adjacent shafts of the second horizontal set.

In witness whereof, I hereunto subscribe my name this 27th day of February, A. D., 1930.

AUGUST SCHWARZ.